3,115,192
COULTER MOUNTING MEANS FOR MOLDBOARD PLOW
Richard W. Bushmeyer, Rockford, Ill., assignor to
J. I. Case Company, Racine, Wis., a corporation of
Wisconsin
Filed July 13, 1960, Ser. No. 42,639
3 Claims. (Cl. 172—166)

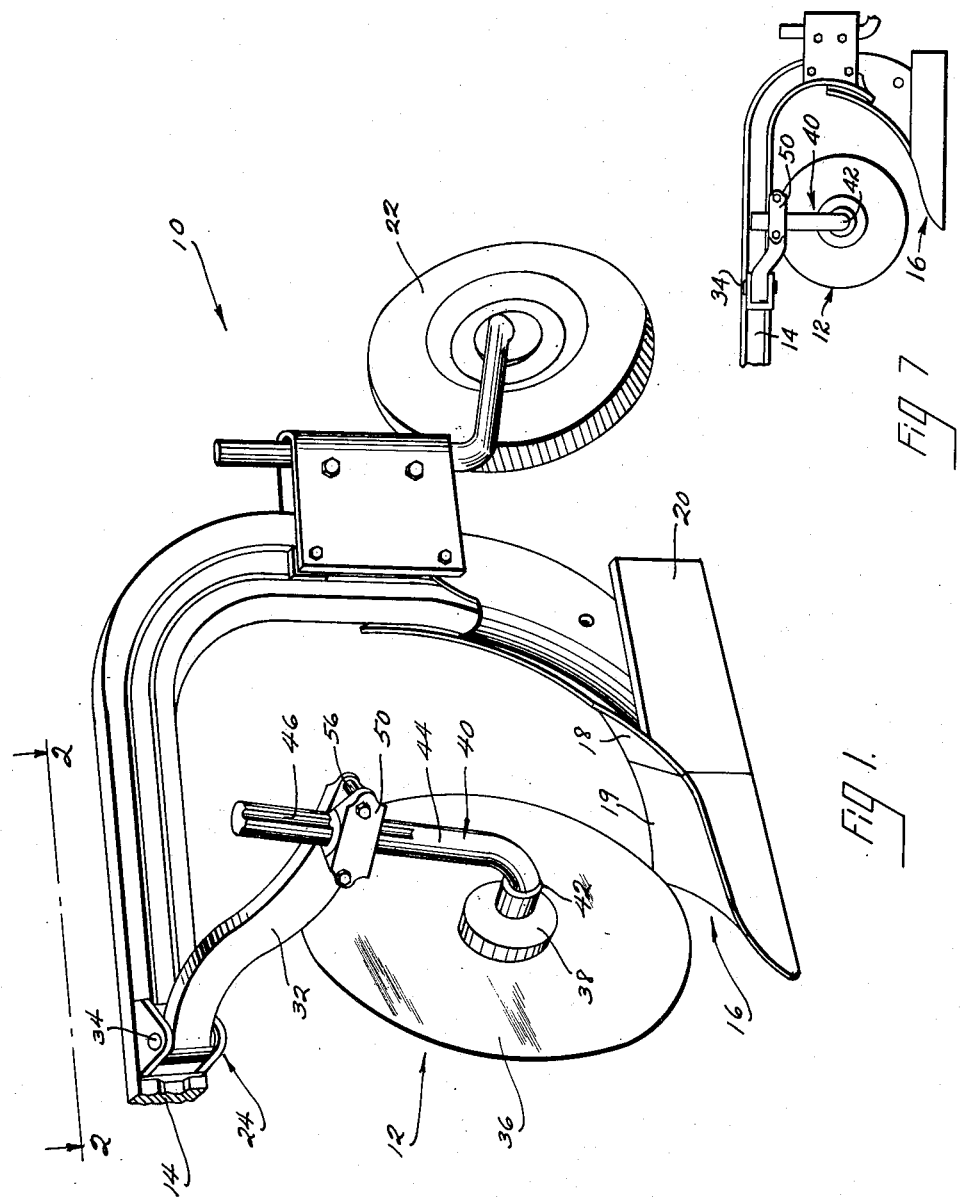

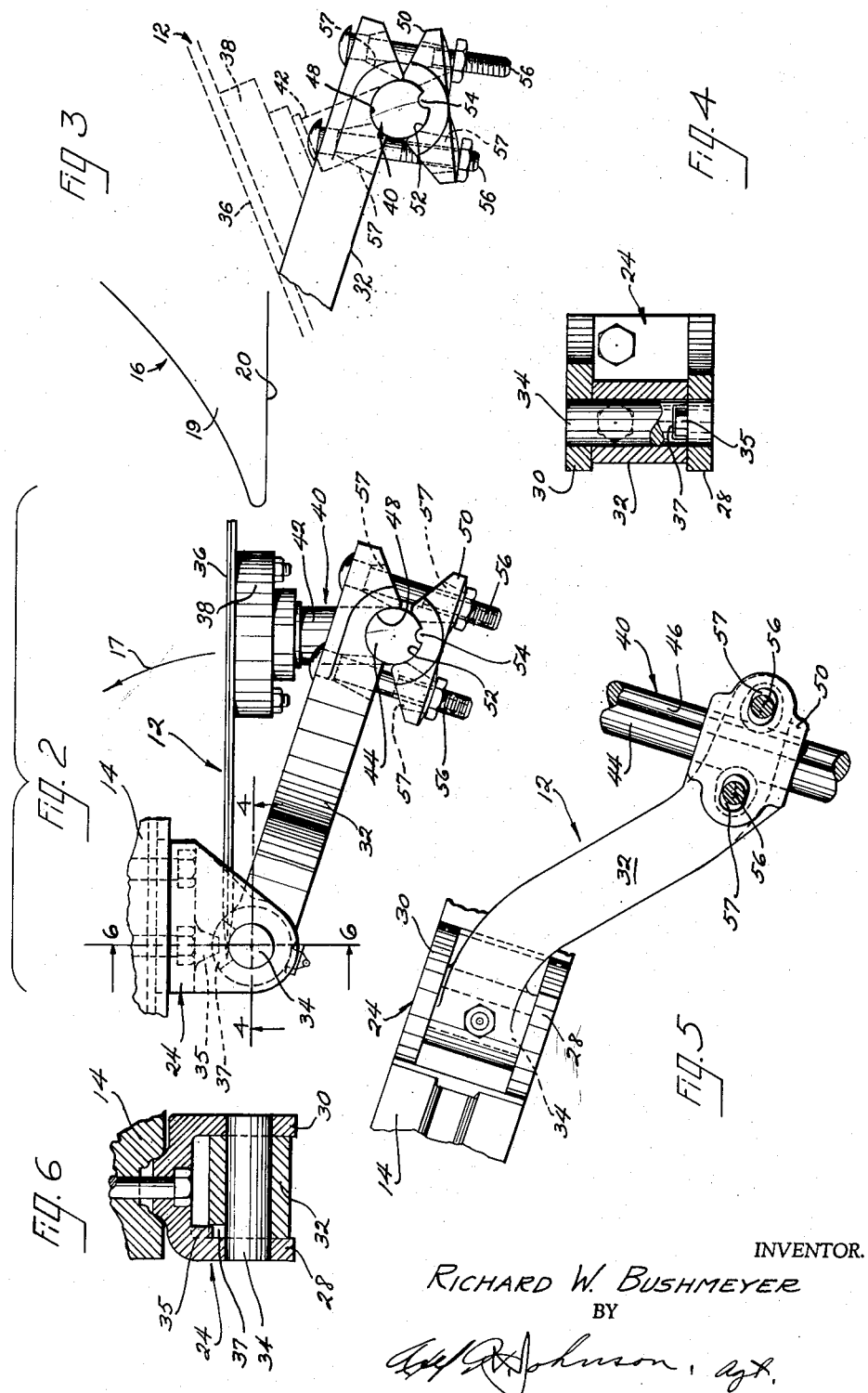

This invention relates to agricultural implements and particularly to a coulter assembly for moldboard plows.

The usual coulter disk mounting is commonly provided with a hinge or pivot connection and mounted on the plow beam so that the disk may swing from side to side to avoid or pass rocks, stumps, or other obstructions encountered in the soil, and also to swing so as to assume proper alignment when the plow is operating in a curved path, as when plowing on the contour. The coulter is primarily intended to align itself directly behind the hinge or pivot, but, in practice, the disk has a tendency to skew at an angle to the direction of travel and to wear rapidly and unsymmetrically thus requiring frequent sharpening. Accordingly, an object of this invention is to provide a freely pivoted coulter mounting that prevents skewing of the coulter disk, and which also urges the disk to travel in a true trailing position.

Another object is to provide a coulter disk mounting that improves the trash cutting ability of the coulter disk.

A further object is to provide such a coulter in which the means for preventing skewing also serves as a convenient means for adjusting the position of the coulter laterally in relation to the plow with which it is associated.

A further object is to provide a coulter construction embodying the above advantages and which will afford maximum clearance for trash.

Further objects and advantages will become apparent from a consideration of the following detailed description taken in connection with the accompanying drawings, wherein an illustrative embodiment of the invention is shown. However, it is to be understood that the invention is not limited to the details disclosed but includes all such variations and modifications as fall within the spirit of the invention.

Referring to the drawings:

FIG. 1 is an elevational perspective view of a moldboard plow having a coulter and its mounting attached thereto.

FIG. 2 is a fragmentary plan view taken at 2—2 of FIG. 1 which generally illustrates the optimum position for effecting minimum wear of the coulter disk.

FIG. 3 is an enlarged fragmentary plan view of the disk mounting showing the disk adjusted to an extreme position.

FIG. 4 is a section taken at 4—4 of FIG. 2.

FIG. 5 is an elevational view constituting a fragmentary orthographic projection of FIG. 2.

FIG. 6 is a section taken at 6—6 of FIG. 2.

FIG. 7 is a left side elevation on a reduced scale, of the mechanism shown in FIG. 1.

Referring again to the drawings, FIG. 1 shows a moldboard plow 10 on which is mounted a coulter assembly 12 embodying this invention.

Plow 10 includes a beam 14 which extends forwardly to a hitch not shown and curves rearwardly and downwardly. A moldboard plow bottom 16 is secured by suitable means to beam 14 and has a moldboard 18, a share 19 and a fore-and-aft extending landside portion 20. A furrow wheel 22 is provided of a type regularly furnished on plows of this type.

The usual disk coulter is commonly freely pivoted to a plow beam and should, when operating properly, trail so that the plane of the disk is parallel to the direction of travel of the plow. However, when the plow is operating, the disk tends to skew or deviate from a plane parallel to the direction of travel and to swing appreciably toward the furrow as indicated by arrow 17 of FIG. 2. This is caused by the loose condition of the soil on that side of the disk, the furrow wall being unsupported and in the process of breaking down by reason of the action of the plow bottom with which the coulter is associated. The pressure of the soil is, therefore, greater against the side of the coulter away from the furrow than it is on the side toward the furrow and it therefore tends to swing the coulter toward the furrow, as hereinbefore stated. As the plow moves forwardly through the soil, the face of the disk will then no longer be parallel to the direction of travel of the plow, and the sharp edge of the disk will be dragged sidewise to a certain extent through the soil causing scuffing of the disk, and uneven wear and dulling of the cutting edge. This undesirable condition can be corrected by offsetting the pivot point relatively to the plane of the disk, although as will appear, in practice it is more desirable to offset the plane of the disk relatively to the pivot in a direction toward the furrow, thus introducing a component into the pulling force of the pivot in a direction away from the furrow. This component or force is adjusted, as will appear, so as to balance the aforesaid greater pressure of the undisturbed soil to an extent sufficient to cause the disk to swing transversely from the skewing position to a straight position so that it will then roll in a direction parallel to the direction of travel of the plow.

Coulter assembly 12, as seen in the drawings, includes a bracket 24 which is secured forwardly of the plow bottom 16 on beam 14 and has a lower lug 28 and an upper lug 30. A pivot arm 32 is mounted between lugs 28 and 30 and is pivoted on an upwardly directed or substantially vertical pin 34 which is fixed in suitable apertures in lugs 28 and 30. Pin 34 is located at a distance from beam 14 and so positioned as to provide the most satisfactory range of adjustment of the coulter assembly as will appear, and to assure that the coulter disk will operate in the optimum relation to the land-side 20 of the plow bottom 16 after adjustments have been made. A stop 35 is provided on lug 28, as shown in FIGS. 2, 4, and 6 and which cooperates with a peripheral notch 37 in arm 32. The purpose of stop 35 and notch 37 is to limit the freedom of the arm 32 to swing, to a predetermined amount.

Arm 32 generally extends rearwardly, downwardly and divergently relatively to beam 14 and carries the coulter disk 36 and its associated parts. This coulter disk or blade 36, when properly adjusted, usually trails in a position so that the plane thereof, is approximately parallel with the plane of the landside 20 of plow 16 and located in some selected position between pin 34 and landside 20. Disk 36 rotates on a generally horizontal axis and is mounted on a hub 38 which serves as a housing for a bearing not shown. A coulter standard 40 is provided having a horizontal journal portion 42 serving to rotatably carry disk 36 by means of hub 38. Standard 40 may be secured or clamped in various positions of adjustment in relation to arm 32, and for this purpose has an upright portion or shank 44 which is provided with a longitudinal key slot 46. Arm 32 is provided with a seat 48 which conforms to the outer surface of shank 44 of standard 40. An adjustment clamp or fastening means 50 completes the couter mounting assembly, and has a seat 52 engaging shank 44. Seat 52 has a key 54 that engages slot 46 of standard 40 so that rocking of clamp 50 will cause turning of standard 40 in seat 48.

Bolts 56 pass through elongated holes 57 which are provided in arm 32 and adjusting clamp 50, and provide the means for securing the latter and the shank 44 rigidly together and in a desired position relative to arm 32, as indicated in FIGS. 2, 3, and 5. As will be apparent, reducing the effective length of one bolt 56 and increasing the effective length of the other by means of the usual nuts engaging clamp 50, will rock the latter and turn or adjust shank 44 angularly. Furthermore, with both bolts in a loosened condition, shank 44 will be slidable in seat 48 and clamp 50 so that up-and-down adjustment of coulter disk 36 can be readily accomplished by the same means which provides the angle adjustment.

Furthermore, by reason of the provision of the long shank portion 44, arm 32 may be disposed relatively high up on the plow, in fact, not far below beam 14 so that there is no structure near the ground forwardly of disk 36, and which feature is highly advantageous when plowing where trash is present, inasmuch as the disk itself, and not part of the arm or shank, is the first element to encounter the trash.

Elongation of holes 57 permits adjustment of clamp 50 to extreme positions without interference from or with bolts 56.

In arriving at the initial adjustment of the coulter, the plow is operated and the position assumed by the disk relative to the direction of travel is observed. If the disk assumes a position not generally parallel to the direction of travel, an adjustment is necessary. See FIGS. 2 and 3. For example, if the disk (as will usually be the case) swings toward the right in a right-hand plow, as viewed facing forwardly from the rear of the plow, the standard 40 is adjusted relatively to arm 32 in a clockwise direction, as viewed from above, by means of bolts 56 and adjustment clamp 50, which will have the effect of shifting pivot 34 to the left relatively to the plane of disk 36 to introduce the force component aforesaid which will tend to overcome the undesired swinging. It has been discovered that, once the necessary amount of offset has been achieved to eliminate the undesired swinging or skewing, considerably more offset does no harm and does not cause swinging or skewing of the coulter in the other direction. Therefore, adjustment to increase the offset beyond the necessary minimum may be used, and since pivot 34 is fixed in relation to beam 14, will operate to change the position of disk 36 in relation to beam 14 and therefore in relation to plow bottom 16. If the aforesaid minimum offset is maintained, the angle or lead adjustment achieved by the clamp 50 then becomes also a means for adjusting the position of the coulter in relation to the plow, and without the necessity of providing adjustment in the spacing of the pivot 34 from beam 14. It is thus necessary to provide only the adjusting clamp 50 and its associated parts which serves the purpose of a lead adjustment for the coulter and a sideward adjustment for the coulter.

If after several adjustments have been made and with the plow operating in the earth, it is found that the disk rotates in a plane generally parallel to the direction of travel, it will be apparent that a satisfactory adjustment has been obtained and that the forces acting on the two sides of the disk are in equilibrium. The disk will then wear uniformly and remain in a sharp condition for a longer period of time than disks operating in conventional mountings which permit the skewing hereinbefore described. It will also follow that the cutting of trash will be more efficiently done in that the disk will encounter the trash perpendicularly to the direction of travel, and also in that it will remain sharp for a longer time.

Having now described my invention and in what manner the same may be used, what I claim as new and desire to protect by Letters Patent of the United States is:

1. In a coulter mounting for use with a moldboard plow of the type having a beam disposed generally in the direction of movement of the plow and a plow bottom fixed on the beam beneath and at the rear end thereof, the combination of a plane sharp edged
   coulter disk, a
   hub on said disk, a
   journal portion on which said hub is rotatably mounted, an upwardly directed
   shank with which said journal portion is rigidly connected transverse to said journal, a
   fastening means on said shank spaced above said journal, a
   coulter arm fixedly connected at one end to said fastening means, an
   upwardly directed pivot on the beam forwardly of the plow bottom, disposed in a plane parallel to the direction of movement of the plow, said coulter arm
   extending forwardly from said shank and having its forward end mounted on said upwardly directed pivot, whereby said shank, said fastening means, and said coulter arm are disposed clear of the space immediately ahead of said coulter disk, so that said disk becomes the element first presented to trash occurring in the path of the coulter to be cut by the action thereof, and said fastening means being constituted to provide
   angular adjustment of said journal by rotation of said shank relatively to said coulter arm whereby the angularity between the plane of said disk and the plane of said upwardly directed pivot parallel to the direction of movement of the plow may be adjusted to bring said coulter disk into a true rolling position rearwardly of said upwardly directed pivot.

2. In a coulter mounting for use with a moldboard plow of the type having a beam disposed generally in the direction of movement of the plow and a plow bottom fixed on the beam beneath and at the rear end thereof, the combination of a plane sharp edged
   coulter disk, a
   hub on said disk, a
   journal portion on which said hub is rotatably mounted, an upwardly directed
   shank with which said journal portion is rigidly connected transverse to said journal, a
   clamp on said shank spaced above said journal, a
   coulter arm fixedly connected at one end to said clamp, an
   upwardly directed pivot on the beam forwardly of the plow bottom, disposed in a plane parallel to the direction of movement of the plow, said coulter arm
   extending forwardly from said clamp and having its forward end mounted on said upwardly directed pivot, whereby said shank, said clamp, and said coulter arm are disposed clear of the space immediately ahead of said coulter disk, so that said disk becomes the element first presented to trash occurring in the path of the coulter to be cut by the action thereof, and said clamp being constituted to provide
   angular adjustment of said journal by rotation of said shank relatively to said coulter arm whereby the angularity between the plane of said disk and the plane of said upwardly directed pivot parallel to the furrow being formed by the plow may be adjusted to bring said coulter disk into a true rolling position rearwardly of said upwardly directed pivot.

3. In a coulter mounting for use with a moldboard plow of the type having a beam disposed generally in the direction of movement of the plow and a plow bottom fixed on the beam beneath and at the rear end thereof, the combination of a plane sharp edged
   coulter disk, a
   hub on said disk, a
   journal portion on which said hub is rotatably mounted, an upwardly directed
   shank with which said journal portion is rigidly connected transverse to said journal, a
   coulter arm, adjusting means by which said coulter arm is fixedly connected at one end to said shank upwardly of said journal, an upwardly directed pivot fixed on the beam forwardly of the plow bottom, disposed in a plane parallel to the direction of movement of the plow, said coulter arm extending forwardly from said shank and having its forward end mounted on said upwardly directed pivot, whereby said shank, said adjusting means, and said coulter arm are disposed clear of the space immediately ahead of said coulter disk, so that said disk becomes the element first presented to trash occurring in the path of the coulter to be cut by the action thereof, and said adjusting means being constituted to provide for changing the angularity between said journal and said coulter arm by turning said shank relatively to said coulter arm to change the angle of said disk relatively to the plane of said pivot parallel to the furrow being formed by the plow.

References Cited in the file of this patent
UNITED STATES PATENTS

| | | |
|---|---|---|
| 431,683 | Anderson | July 8, 1890 |
| 1,097,339 | Lauterbach | May 19, 1914 |
| 2,674,174 | Altgelt | Apr. 6, 1954 |
| 2,949,968 | Stoner | Aug. 23, 1960 |